United States Patent
Skaff et al.

(10) Patent No.: US 9,776,643 B2
(45) Date of Patent: Oct. 3, 2017

(54) ELECTRIC RANGE IMPACT FACTOR DISPLAY AND ALGORITHMS

(71) Applicant: Ford Global Technologies, LLC, Dearborn, MI (US)

(72) Inventors: Ryan J. Skaff, Farmington Hills, MI (US); Jason Meyer, Canton, MI (US); Craig Edward Esler, Plymouth, MI (US); Dale Gilman, Beverly Hills, MI (US); Paul Aldighieri, Grosse Pointe Farms, MI (US); Yevgeniya Sosonkina, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 14/536,977

(22) Filed: Nov. 10, 2014

(65) Prior Publication Data

US 2016/0129918 A1    May 12, 2016

(51) Int. Cl.
   *B60Q 1/00*      (2006.01)
   *B60W 50/14*     (2012.01)
   *B60L 11/18*     (2006.01)

(52) U.S. Cl.
   CPC .......... *B60W 50/14* (2013.01); *B60L 11/1861* (2013.01); *B60W 2510/248* (2013.01);
   (Continued)

(58) Field of Classification Search
   CPC .......... B60W 50/14; B60W 2510/248; B60W 2510/305; B60W 2530/14; B60W 2540/30; B60W 2550/00; B60L 11/1861
   (Continued)

(56) References Cited

U.S. PATENT DOCUMENTS 5,623,194 A * 4/1997 Boll ..................... B60L 11/1816
                                                     320/137
6,961,656 B2  11/2005 Kim
(Continued)

FOREIGN PATENT DOCUMENTS

FR      2961775 A1    12/2011
WO   2013126263 A3    8/2013

OTHER PUBLICATIONS

Chevy Volt Display May Not Show Instantaneous MPG, http://gm-volt.com/2009/10/06/chevy-volt-display-may-not-show-instantaneous-mpg/.

*Primary Examiner* — Daryl Pope
(74) *Attorney, Agent, or Firm* — David B. Kelley; Brooks Kushman P.C.

(57) ABSTRACT

A method is provided for estimating range per full charge (RPC) for a vehicle. The method includes a controller which may, in response to detecting presence of a predefined condition impacting vehicle energy consumption, output to an interface by a controller a RPC and indicia indicative of an extent to which the predefined condition is affecting the RPC. An electrified vehicle including one or more vehicle components, a traction battery to supply energy to the vehicle components, one or more sensors, and a controller is also provided. The one or more sensors monitor the vehicle components, traction battery, and preselected ambient conditions. The controller is configured to, in response to input from the sensors, generate output for an interface which includes a RPC and indicia indicative of an extent of impact on the RPC by each of the ambient conditions and operation of the components and battery.

20 Claims, 9 Drawing Sheets

(52) U.S. Cl.
CPC ... *B60W 2510/305* (2013.01); *B60W 2530/14* (2013.01); *B60W 2540/30* (2013.01); *B60W 2550/00* (2013.01)

(58) Field of Classification Search
USPC ............. 340/425.5, 455; 320/137, 155
See application file for complete search history.

(56) References Cited

U.S. PATENT DOCUMENTS

| | | |
|---|---|---|
| 8,606,459 B2 | 12/2013 | Sekiyama et al. |
| 2012/0143435 A1 | 6/2012 | Cho et al. |
| 2012/0179311 A1 | 7/2012 | Skaff et al. |
| 2013/0073113 A1 | 3/2013 | Wang et al. |
| 2013/0253740 A1 | 9/2013 | Kim |
| 2013/0311016 A1 | 11/2013 | Kim |
| 2014/0095060 A1 | 4/2014 | Heo et al. |

\* cited by examiner

ELECTRIC RANGE IMPACT FACTOR DISPLAY AND ALGORITHMS

TECHNICAL FIELD

This disclosure relates to range per full charge prediction for vehicles including an energy conversion device such as an electric machine.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells. Vehicles with one or more HV batteries may include a battery management system that measures and/or estimates values descriptive of the HV battery, vehicle components, and/or battery cell present operating conditions. The battery management system may also output information relating to the measurements and estimates to an interface.

SUMMARY

A method for estimating range per full charge (RPC) for a vehicle includes, in response to detecting presence of a predefined condition impacting vehicle energy consumption, outputting to an interface by a controller a RPC and indicia indicative of an extent to which the predefined condition is affecting the RPC. The predefined condition may include at least one of an auxiliary load factor, a propulsive factor due to driving style, a propulsive factor due to battery age, or a propulsive factor due to ambient conditions. The RPC and indicia may be based on projected consumption rates that account for the predefined condition and may be based on a preselected calibratable distance of vehicle travel. The RPC and indicia may be based on consumption rates that account for the predefined condition and may be learned during a predefined interval of a drive cycle while the predefined condition is present. The RPC and indicia may be further based on average energy consumption rates and a total vehicle energy consumption associated with the predefined interval. The RPC and indicia may be further based on a difference between the average energy consumption rates and preselected nominal consumption conditions associated with the predefined condition. The interval may be a time-based interval, a trip-based interval, or a distance-based interval. At least one of the indicia may be a graphical element showing range distance relative to a state of charge of an energy storage device of the vehicle. At least one of the indicia may be a graphical element showing a power consumption percentage relative to a state of charge of an energy storage device of the vehicle. At least one of the indicia is a graphical element showing a power consumption percentage relative to the RPC over a preselected calibratable distance.

An electrified vehicle includes one or more vehicle components, a traction battery to supply energy to the vehicle components, one or more sensors, and a controller. The one or more sensors monitor the vehicle components, traction battery, and preselected ambient conditions. The controller is configured to, in response to input from the sensors, generate output for an interface which includes a RPC and indicia indicative of an extent of impact on the RPC by each of the ambient conditions and operation of the components and battery. At least one of the vehicle components may be configured for activation by a driver and the indicia may include an indicator identifying a reduction in the RPC due to activation of the at least one of the vehicle components. At least one of the vehicle components may draw current from the battery when activated and the indicia may include an indicator identifying a reduction in the RPC due to activation of the at least one of the vehicle components. The indicia may be a graphical element showing a power consumption percentage relative to a preselected time-based interval, a trip-based interval, or a distance-based interval.

A vehicle traction battery system includes a traction battery, a vehicle component configured to draw current from the traction battery, an interface, and a controller. The controller is configured to, in response to detecting an energy consumption change condition due to the current, output to the interface a RPC and indicia indicative of an extent of reduction to the RPC due to the current. At least one of the indicia may be a graphical element showing a power consumption percentage relative to a preselected time-based interval, a trip-based interval, or a distance-based interval. The vehicle may also include another vehicle component configured to be activated by a driver. The controller may be further configured to, in response to detecting an activation condition for the another vehicle component, output to the interface indicia indicative of an extent of reduction to the RPC due to activation of the another vehicle component. The controller may be further configured to, in response to detecting an energy consumption change condition due to ambient conditions, output to the interface indicia indicative of an extent of reduction to the RPC due to the ambient conditions.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
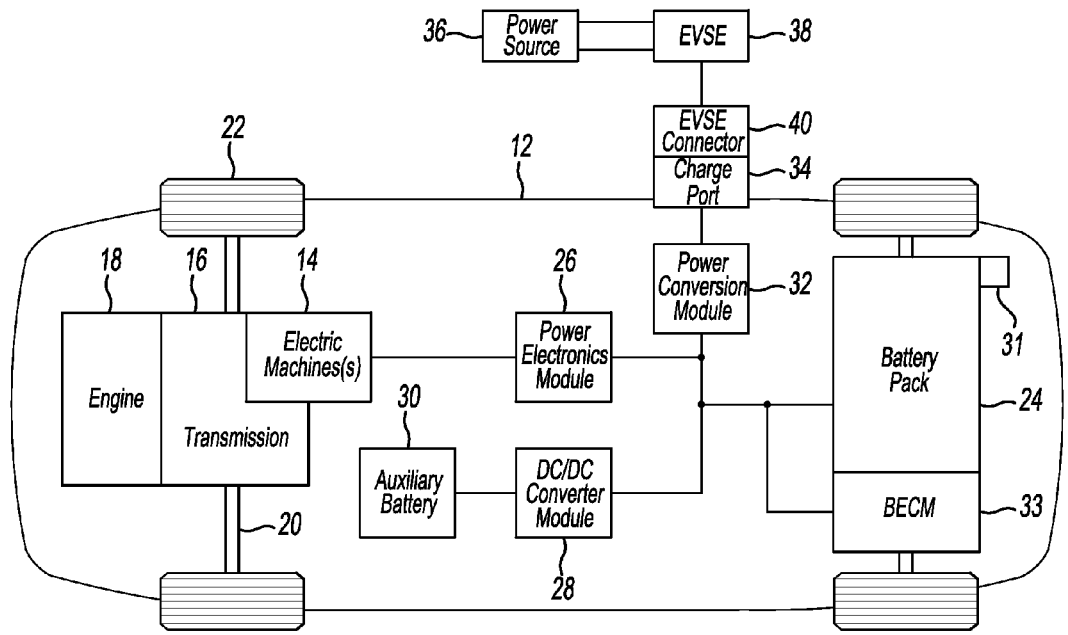
FIG. 1 is a schematic illustrating a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

Figure 2:
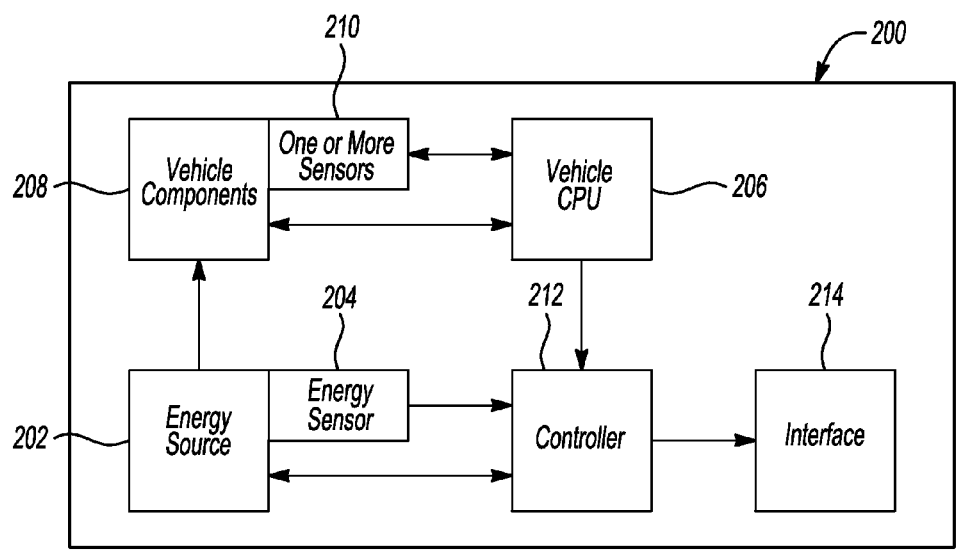
FIG. 2 is a block diagram illustrating an example of a vehicle.

Accurately understanding energy consumption properties of various vehicle components is an integral part of estimating a distance to empty (DTE) range of vehicles having an energy conversion device, such as an engine or electric machine, and an energy source, such as a fuel tank or HV battery. FIG. 2 shows a vehicle 200 which may include an energy source 202. The vehicle 200 may be, for example, an electrified vehicle with a friction brake system and a regenerative brake system. An energy sensor 204 may be in communication with the energy source 202, such as an HV battery pack, to measure power levels of battery cells within the HV battery pack. The energy sensor 204 for an HV battery pack may include a current sensor, a voltage sensor, and an accompanying battery control unit. The energy sensor 204 may be located in a suitable position including within, adjacent to, or proximate to the energy source 202. A vehicle computer processing unit ("CPU") 206 may be in communication with a plurality of vehicle components 208 and a plurality of one or more sensors 210 such that the CPU 206 may receive information regarding the vehicle components 208 and also direct operation thereof. Non-limiting examples of vehicle components 208 may include an engine, a transmission, a differential, an after treatment system, a lubrication system, one or more electric motors, electric machines, tires, a cabin climate control system, a brake system, a battery pack thermal management system, an engine thermal management system, and an electric machine thermal management system.

The one or more sensors 210 may include sensors appropriate to measure conditions of corresponding vehicle component 208 and other factors. For example, the energy sensor 204 may be a battery state of charge estimator. As another example, the one or more sensors 210 may include sensors to measure friction brake torque and wheel speed. As yet another example, the one or more sensors 210 may include sensors to measure atmospheric conditions. A controller 212 may be in communication with the vehicle CPU 206, the energy sensor 204, and the energy source 202 to receive information relating to the vehicle components 208 and the energy source 202. The controller 212 may also be in communication with an interface 214 located in a cabin of the vehicle 200 to display and/or communicate information relating to the vehicle components 208 and the energy source 202.

Figure 3:
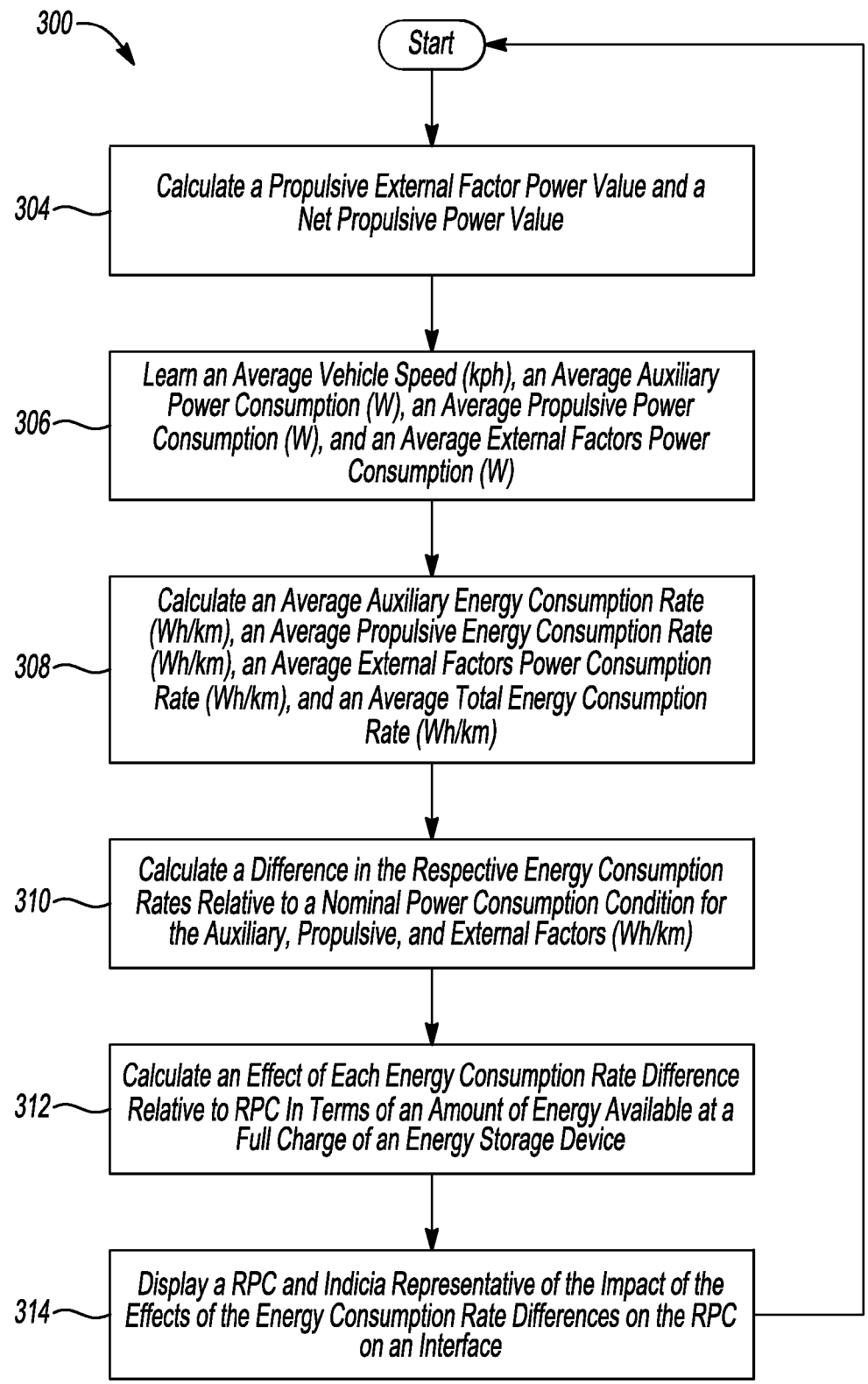
FIG. 3 is a flow chart illustrating an example of an algorithm for operation of a range per full charge (RPC) prediction architecture.

FIG. 3 shows an example of an algorithm for calculating a DTE for an electrified vehicle, for example the vehicle 200, which may predict energy consumption outputs for display on an interface. The energy consumption outputs may be displayed as indicators which identify various categorical impact factors which affect energy consumption of the vehicle. The algorithm is generally represented by reference numeral 300. In this example, the energy consumption categories may include an auxiliary category and a propulsive category though it is contemplated that other energy consumption categories or other groupings of the categorical impact factors may be utilized with the algorithm 300. In this example, the auxiliary category may include energy consumption due to operation of vehicle components, for example the vehicle components 208 which may include a climate control system and components requiring DC/DC loads. Examples of components which may draw DC/DC loads may include vehicle sensors, control modules, interior/exterior lighting, audio/infotainment systems, and 12V power outlets. The propulsive category may include two propulsion related sub categories. Propulsive factors which are driver controlled may be a first sub category and external factors which are outside the control of the driver may be a second sub category which may be referred to as an external factor category or an ambient factor category herein. The driver controlled sub category may be referred to as a driver style category herein. The driver style category may include energy consumption effects relating to, for example, acceleration, regenerative braking energy recapture performance, elevation changes, and cruising speed. The external factors category may include energy consumption effects which may occur or be present during a drive cycle relating to, for example, air density, a cold start of the vehicle, and battery age.

In operation 304, a controller, for example the controller 212, may calculate a propulsive external factor power value and a net propulsive power value based on propulsive factors of the driver style category and the external factor category. In operation 306, the controller 212 may learn an average vehicle speed (kph), an average auxiliary power consumption (W), an average propulsive power consumption (W), and an average external factors power consumption. In operation 308, the controller may calculate an average energy consumption rate (Wh/km), an average propulsive energy consumption rate (Wh/km), an average external factors power consumption rate (Wh/km), and an average total energy consumption rate (Wh/km). In operation 310, the controller may calculate a difference in the respective energy consumption rates relative to a nominal power consumption condition for the auxiliary, propulsive, and external factors. The values of the nominal power consumption conditions may be predetermined. For example, the values may be based on accessible lab test data from a fuel economy cycle. The values may also be based on predetermined energy consumption targets representing preferred vehicle performance or preferred vehicle component performance. In operation 312, the controller may calculate an effect of each energy consumption rate difference relative to a rated or target range in terms of a full charge electric range (km) of the vehicle. In operation 314, an interface, for example the interface 214, may display a rated range per full charge (RPC) and indicia representative of the impact of the effects of the energy consumption rate differences on the rated RPC.

Figure 4:
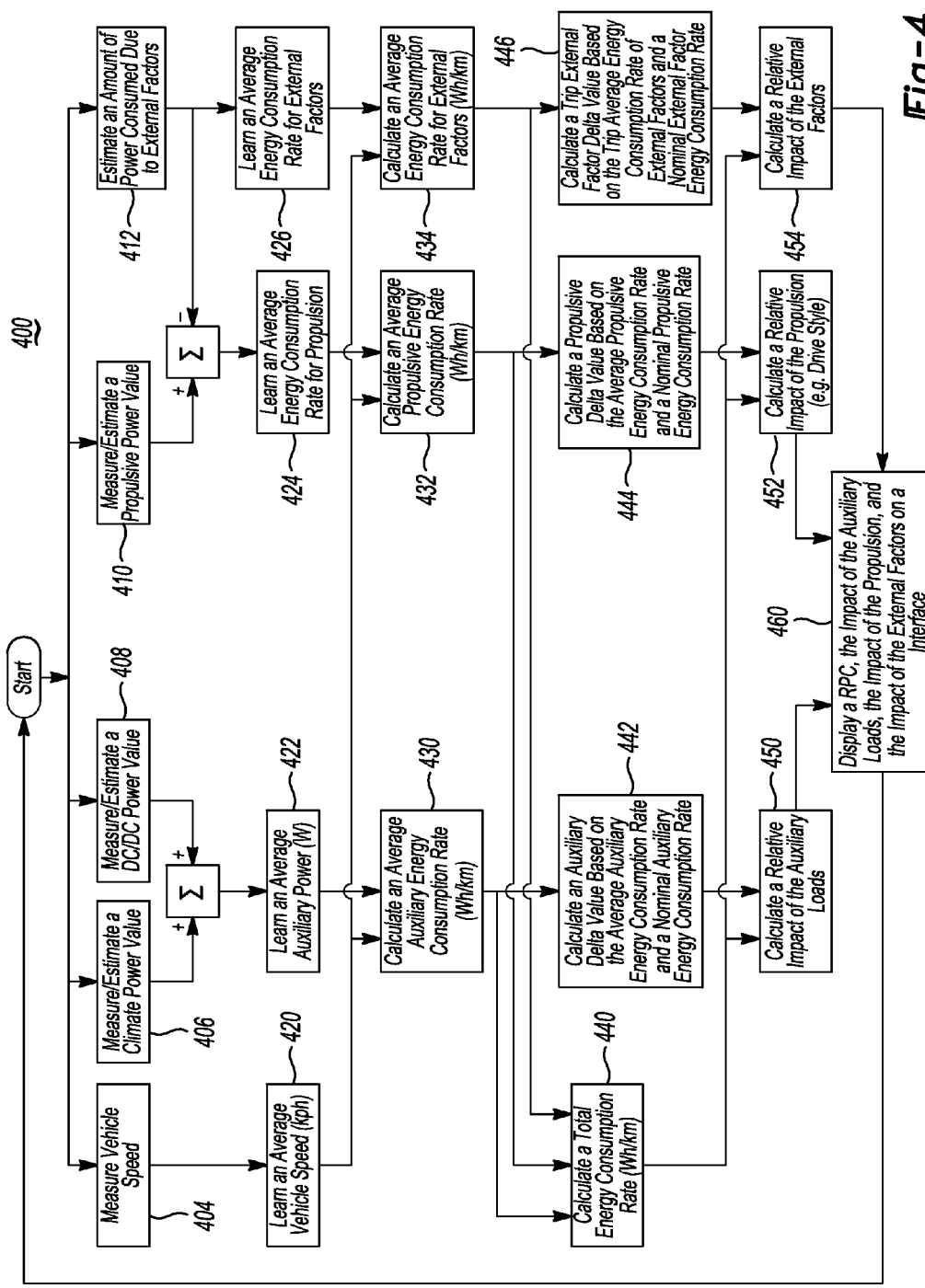
FIG. 4 is a flow chart illustrating an example of a time-based algorithm for operation of a RPC prediction architecture.

FIG. 4 shows an example of an algorithm with a time-based average for calculating a RPC for an electrified vehicle, for example the vehicle 200, which may predict energy consumption outputs for display on an interface, for example the interface 214. The energy consumption outputs may be displayed as indicators which identify various categorical impact factors which affect energy consumption of the vehicle. The algorithm is generally indicated by reference numeral 400. In this example and similar to the algorithm 300, the energy consumption categories may include an auxiliary category and a propulsive category though it is contemplated that other energy consumption categories or other groupings of categorical impact factors may be utilized with the algorithm 400. In this example and similar to the example above, the auxiliary category may include energy consumption due to operation of vehicle components, for example the vehicle components 208, such as a climate control system and components requiring DC/DC loads. Other examples of vehicle components which may draw DC/DC loads may include vehicle sensors, control modules, interior/exterior lighting, audio/infotainment systems, and 12V power outlets. The propulsive category may include two propulsion related sub categories. Propulsive factors which are driver controlled may be a first sub category and external factors which may be outside the control of the driver may be a second sub category which may be referred to as an external factor category or an ambient factor category herein. The driver controlled sub category may be referred to as a driver style category herein. The driver style category may include energy consumption effects relating to, for example, acceleration, regenerative braking energy recapture performance, elevation changes, and cruising speed. The external factors category may include energy consumption effects which may occur or be present during a drive cycle relating to, for example, air density, a cold start of the vehicle, and battery age.

In operation 404, one or more sensors, for example the one or more sensors 210, may measure a speed of the vehicle and transmit the measurement to a controller, such as the controller 212. In operation 406, the one or more sensors may measure an amount of energy consumed by a climate system and transmit the information to the controller which may estimate a climate power value. In operation 408, the one or more sensors may measure an amount of energy consumed by DC/DC loads and transmit the information to the controller which may estimate a DC/DC power value. In operation 410, the one or more sensors may measure energy consumption by propulsive factors of the driver style category and transmit the information to the controller which may estimate a propulsive power value. In operation 412, the controller may estimate an amount of power consumed by the propulsive factors of the external factor category. As such, the controller may calculate an amount of power consumed due to the propulsive factors of the external factor category according to $$P_{ext} = \text{mass} * g * \sin(\theta_{grade}) * v(k) + f_1(T_{oil}, p_{tire}) + f_2(\rho_{amb})$$

where $P_{ext}$=power consumed due to the external factors, m=vehicle mass, g=acceleration due to gravity, v=vehicle speed, $T_{oil}$=oil temperature, $p_{tire}$=tire pressure, $\rho_{amb}$=ambient pressure, $f_1()$=calibration table representing the effects of vehicle warm up as a function of oil temperature and tire pressure, and $f_2()$=calibration table representing the effects of air density. In another example, $P_{ext}$ may be calculated based on one or more calibration tables and/or test data relating to an additional amount of power required to drive the vehicle under various conditions, such as various ambient temperatures and/or oil temperatures. The controller may also calculate the propulsive power value excluding the amount of energy consumed due to the external factors according to $$P_{prop,base} = P_{prop} - P_{ext}$$

where $P_{prop,base}$=propulsive power excluding external factors and $P_{prop}$=propulsive power.

In operation 420, the controller may learn an average vehicle speed (kph) based on the measured vehicle speed and an accessible history of previous drive cycles. In operation 422, the controller may learn an average auxiliary power (W) based on the estimate climate power value and the estimated DC/DC power value. In operation 424, the controller may learn an average energy consumption rate for propulsion based on the estimated propulsion power and the estimated amount of power consumed due to the external factors. In operation 426, the controller may learn an average energy consumption rate for the external factors based on the estimated amount of power consumed due to the external factors. For example, the controller may learn the average power consumption for auxiliary, propulsive, and external factors in watts according to $$p_{x,avg}(k) = (1-\alpha) * p_{p,avg}(k-1) + \alpha * p_x(k)$$

where $p_{x,avg}$=average power consumed for factor x, $p_x$=current power consumed for factor x, k=discrete time index, and $\alpha$=filter constant.

In operation 430, the controller may calculate an average auxiliary energy consumption rate (Wh/km) based on the average vehicle speed and the average auxiliary power. In operation 432 the controller may calculate an average propulsive energy consumption rate (Wh/km) based on the average vehicle speed and the average energy consumption rate for propulsion. In operation 434 the controller may calculate an average energy consumption rate of the external factors (Wh/km) based on the average vehicle speed and the average energy consumption rate for the external factors. For example, the controller may calculate the average auxiliary energy consumption rate, the average propulsive energy consumption rate, and the average energy consumption rate of external factors according to $$r_{x,avg} = p_{x,avg} / v_{avg}$$

where $r_{x,avg}$=average energy consumption rate due to factor x and $v_{avg}$=average vehicle speed.

In operation 440, the controller may calculate a total energy consumption rate of the vehicle based on the average auxiliary energy consumption rate, the average propulsive energy consumption rate, and the average energy consumption rate of the external factors. In operation 442, the controller may calculate an auxiliary delta value based on a difference between the average energy consumption rate and a nominal auxiliary consumption rate retrieved from a database. In operation 444, the controller may calculate a propulsive delta value based on a difference between the average propulsive energy consumption rate and a nominal propulsive energy consumption rate. In operation 446, the controller may calculate an external factor delta value based on a difference between the average energy consumption rate of the external factors and a nominal energy consumption rate of the external factors. The nominal values for the auxiliary consumption rate, the propulsive energy consumption rate, and the energy consumption rate of the external factors may each be based on data obtained during a fuel economy certification cycle or other predetermined values which may be related to target energy consumption of the vehicle components. This data may be accessible by the controller. For example, the controller may calculate the difference between the average rates and nominal conditions for, propulsive, and the external factors (Wh/km) according to $$r_{x,diff} = r_{x,avg} - r_{x,nom}$$

where $r_{x,diff}$=difference in energy consumption rate (i.e. delta value) for factor x and $r_{x,nom}$=nominal energy consumption rate of factor x.

In operation 450, the controller may calculate a relative impact of the auxiliary loads based on the total energy consumption rate and the auxiliary delta value. In operation 452 the controller may calculate a relative impact of the propulsion system based on the total energy consumption rate and the propulsive delta value. In operation 454 the controller may calculate a relative impact of the external factors based on the total energy consumption rate and the external factor delta value. For example, the controller may calculate the effect of each energy consumption category relative to a rated and/or target RPC in terms of each categories' impact to electric range at full charge (km) according to $$I_x = \text{erange}_{nom} * r_{x,diff} / r_{avg}$$

where $I_x$=impact of factor x on distance to empty relative to the respective nominal condition, $\text{erange}_{nom}$=electric range at full charge corresponding to the respective nominal condition, and $r_{avg}$=average total energy consumption rate of the vehicle.

In operation 460, the controller may display the relative impact of the auxiliary loads, the relative impact of the propulsion system, and the relative impact of the external factors on an interface. In operation 460, the controller may also display a RPC which accounts for the relative impact factors. Each of the relative impacts may be displayed individually on the interface to provide clarity on the effect of the energy consumption categories relative to the RPC. This clarity may provide a driver with an understanding of the RPC effect relating to driving style and system operations. As such, the output to the display may provide a driving coach of sorts.

Figure 5A:
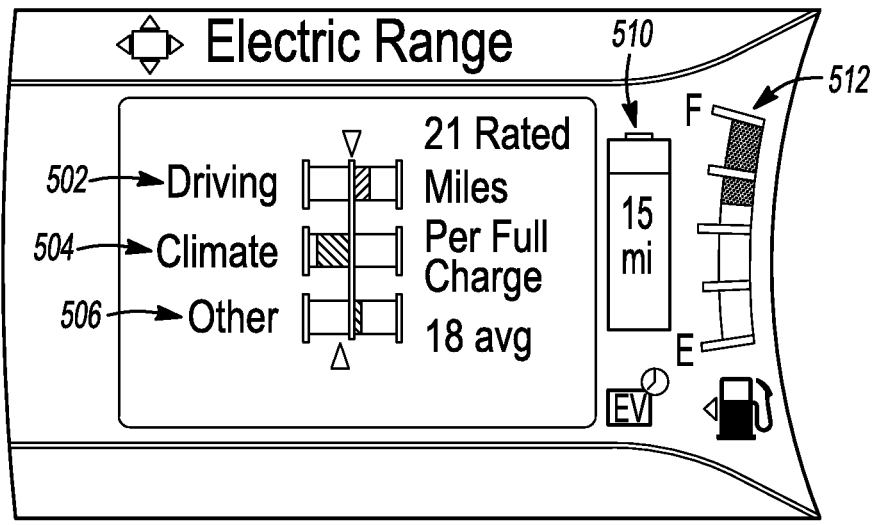
FIG. 5A is an illustrative view of an example of a configuration of outputs for an interface which may include indicators for energy consumption categories relating to RPC prediction algorithms.
Figure 5B:
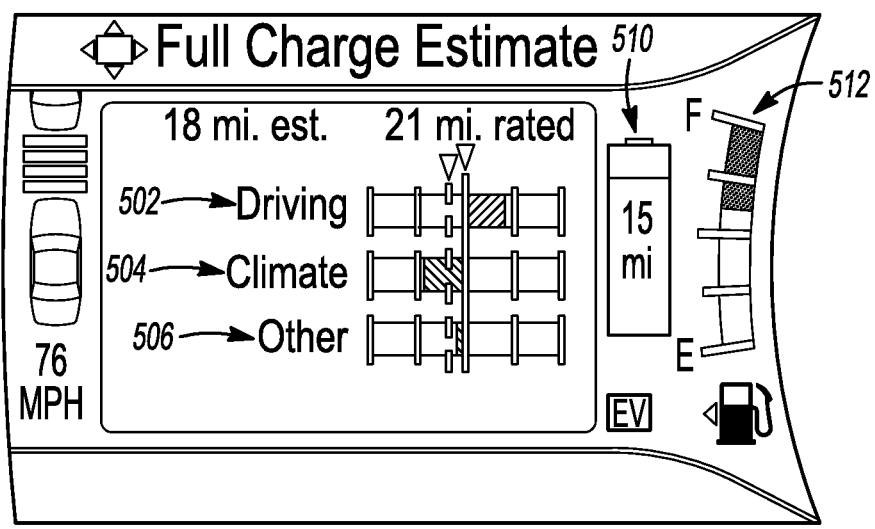
FIG. 5B is an illustrative view of an example of another configuration of outputs for an interface which may include indicators for energy consumption categories relating to RPC prediction algorithms.
Figure 5C:
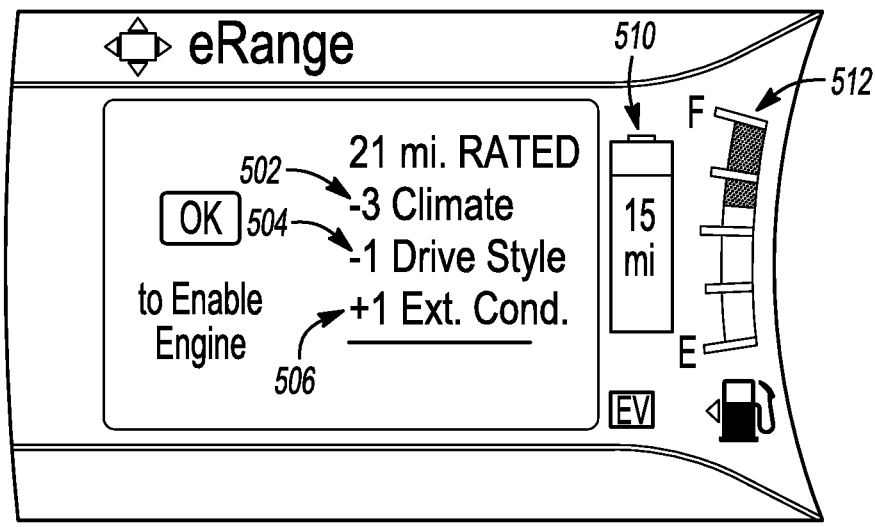
FIG. 5C is an illustrative view of an example of another configuration of outputs for an interface which may include indicators for energy consumption categories relating to RPC prediction algorithms.
Figure 5D:
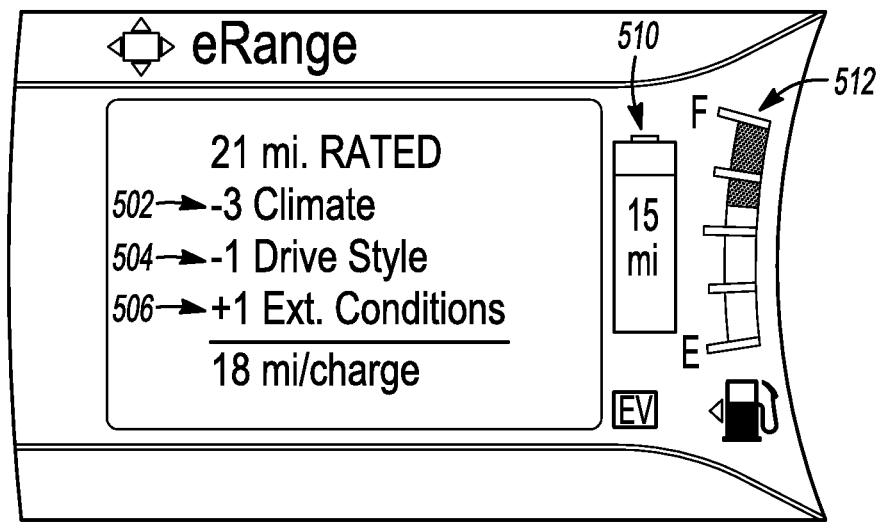
FIG. 5D is an illustrative view of an example of another configuration of outputs for an interface which may include indicators for energy consumption categories relating to RPC prediction algorithms.
Figure 5E:
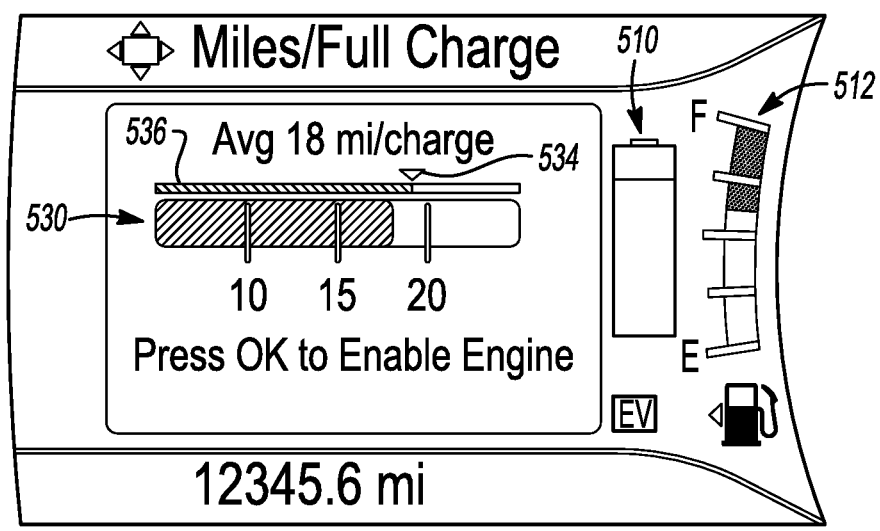
FIG. 5E is an illustrative view of an example of another configuration of outputs for an interface which may include indicators for energy consumption categories relating to RPC prediction algorithms.

FIGS. 5A through 5E show examples of interface configurations to display the RPC effect of the energy consumption of the impact factors. The interface may display a climate system indicator 502, a drive style indicator 504, and an external conditions indicator 506. The drive style indicator 504 may represent the energy consumption effect of the propulsive factors which are controlled by the driver within the driver style category as described above. The climate system indicator 502 may represent the energy consumption effect of the climate control system operation within the auxiliary category as described above. The external conditions indicator 506 may represent the effect of the propulsive factors which may be outside of the driver's control within the external factor category as described above. In terms of RPC, a positive value shown on the respective indicator may represent a vehicle performance improvement and a negative value shown on the respective indicator may represent a vehicle performance diminishment. The interface may also include a DTE indicator 510 and a fuel level indicator 512. The DTE indicator 510 may display the DTE of the vehicle based on an amount of energy remaining in the HV battery and the energy consumption of the impact factors. In FIG. 5E, the interface configuration includes an instantaneous range per full charge bar 530, an average range per full charge indicator 534, and a rated range per full charge indicator 536. The instantaneous range per full charge bar 530 may represent a real time energy consumption effect of vehicle operating conditions. The average range per full charge indicator 534 may represent an average energy consumption effect based on historical data. The rated range per full charge indicator 536 may represent an energy performance range of the vehicle which may be based on one or more calibration tables and/or test data.

Figure 6:
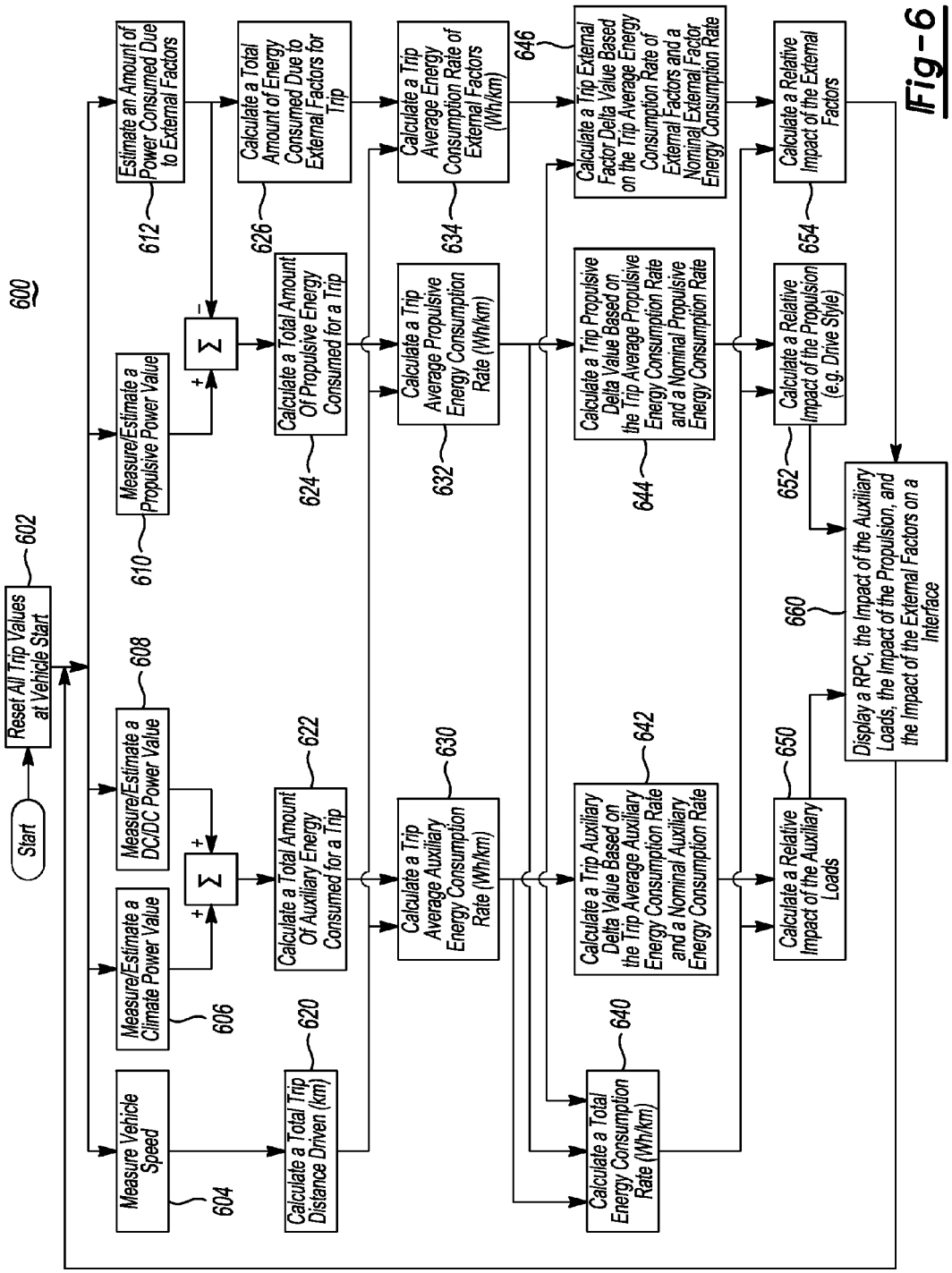
FIG. 6 is a flow chart illustrating an example of a trip-based algorithm for operation of a RPC prediction architecture.

FIG. 6 shows an example of an algorithm with a trip-based average for calculating a RPC for an electrified vehicle, for example the vehicle 200, which may predict energy consumption outputs for display on an interface, for example the interface 214. The energy consumption outputs may be displayed as indicators which identify various categorical impact factors which affect energy consumption of the vehicle. The algorithm is generally indicated by reference numeral 600. In this example, the energy consumption categories may include an auxiliary category and a propulsive category though it is contemplated that other energy consumption categories or groupings of the categorical impact factors may be utilized with the algorithm 600. In this example, the auxiliary category may include energy consumption due to operation of vehicle components, for example the vehicle components 208, such as a climate control system and components requiring DCDC loads. The propulsive category may include two propulsion related sub categories. Propulsive factors which are driver controlled may be a first sub category and external factors which may be outside the control of the driver may be a second sub category which may be referred to as an external factor category or an ambient factor category herein. The driver controlled sub category may be referred to as a driver style category herein. The driver style category may include energy consumption effects relating to, for example, acceleration, regenerative braking energy recapture performance, elevation changes and cruising speed. The external factors category may include energy consumption effects which may occur or be present during a drive cycle relating to, for example, air density, a cold start of the vehicle, and battery age.

In operation 602, the controller may reset all trip values at vehicle start. In operation 604, one or more sensors, for example the one or more sensors 210, may measure a speed of the vehicle and transmit the measurement to a controller, such as the controller 212. In operation 606, the one or more sensors may measure an amount of energy consumed by a climate system and transmit the information to the controller which may estimate a climate power value. In operation 608, the one or more sensors may measure an amount of energy consumed by DCDC loads and transmit the information to the controller which may estimate a DCDC power value. In operation 610, the one or more sensors may measure energy consumption by propulsive factors of the driver style category and transmit the information to the controller which may estimate a propulsive power value. In operation 612, the controller may estimate an amount of power consumed by the propulsive factors of the external factor category. As such, the controller may calculate an amount of power consumed due to the propulsive factors of the external factor category according to $$P_{ext} = \text{mass} * g * \sin(\theta_{grade}) * v(k) + T_{oil} p_{tire} + f_2(\rho_{amb})$$

where $P_{ext}$=power consumed due to the external factors, m=vehicle mass, g=acceleration due to gravity, v=vehicle speed, $T_{oil}$=oil temperature, $p_{tire}$=tire pressure, $\rho_{amb}$=ambient pressure, $f_1(,)$=calibration table representing the effects of vehicle warm up as a function of oil temperature and tire pressure, and $f_2(\,)$=calibration table representing the effects of air density. In another example, $P_{ext}$ may be calculated based on one or more calibration tables and test data relating to an additional amount of power required to drive the vehicle under various conditions, such as various ambient temperatures and/or oil temperatures. The controller may also calculate the propulsive power value excluding the amount of energy consumed due to the external factors according to $$P_{prop,base} = P_{prop} - P_{ext}$$

where $P_{prop,base}$=propulsive power excluding external factors and $P_{prop}$=propulsive power.

In operation 620, the controller may calculate a total trip distance (km). In operation 622, the controller may calculate a total amount of auxiliary energy consumed for a trip. In operation 624, the controller may calculate a total amount of propulsive energy consumed for the trip. In operation 626, the controller may calculate a total amount of energy consumed due to external factors for the trip. For example, the controller may calculate the total trip energy consumed for auxiliary, propulsive, and external factors in watts-hours according to $$e_{x,trip}(k) = e_{x,trip}(k-1) + \Delta t * p_x(k)$$

where $e_{x,trip}$=trip energy consumed for factor x and $\Delta t$=calculation loop time. The controller may also calculate the total trip distance driven in kilometers according to $$d_{trip}(k) = d_{trip}(k-1) + \Delta t * v(k)$$

where $d_{trip}$=trip distance.

In operation 630, the controller may calculate a trip average auxiliary energy consumption rate (Wh/km) based on the total trip distance driven and the total amount of auxiliary energy consumed for the trip. In operation 632, the controller may calculate a trip average propulsive energy consumption rate (Wh/km) based on the total trip distance driven and the total amount of propulsive energy consumed for the trip. In operation 634, the controller may calculate a trip average energy consumption rate of external facts (Wh/km) based on the total trip distance driven and the total amount of energy consumed due to external factors for a trip. In operation 640, the controller may calculate a total energy consumption rate (Wh/km) based on the trip average auxiliary consumption rate, the trip average propulsive energy consumption rate, and the trip average energy consumption rate of the external factors. For example, the controller may calculate the trip average energy consumption rate for auxiliary, propulsive, and external factors in watts-hours per kilometer and the trip average total energy consumption rate according to $$r_{x,avg} = e_{x,trip}/d_{trip}$$

where $r_{x,avg}$=average energy consumption rate due to factor x, $e_{x,trip}$=trip energy consumed for factor x, and $d_{trip}$=trip distance.

In operation 642, the controller may calculate a trip auxiliary delta value based on the trip average auxiliary energy consumption rate and a nominal auxiliary energy consumption rate. In operation 644, the controller may calculate a trip propulsive delta value based on the trip average energy consumption rate and a nominal propulsive energy consumption rate. In operation 646, the controller may calculate a trip external factor delta value based on the trip average energy consumption rate of external factors and a nominal external factor energy consumption rate. The nominal values for the auxiliary consumption rate, the propulsive energy consumption rate, and the energy consumption rate of the external factors may each be based on data obtained during a fuel economy certification cycle. This data may be accessible by the controller. For example, the controller may calculate the difference between the average rates and nominal conditions for auxiliary, propulsive, and the external factors (Wh/km) according to $$r_{x,diff} = r_{x,avg} - r_{x,nom}$$

where $r_{x,diff}$=different in energy consumption rate (i.e. delta value) for factor x and $r_{x,nom}$=nominal energy consumption rate of factor x.

In operation 650, the controller may calculate a relative impact of the auxiliary loads based on the total energy consumption rate and the trip auxiliary delta value. In operation 652 the controller may calculate a relative impact of the propulsion system based on the total energy consumption rate and the trip propulsive delta value. In operation 654 the controller may calculate a relative impact of the external factors based on the total energy consumption rate and the trip external factor delta value. For example, the controller may calculate the effect of each energy consumption category relative to distance to empty and in terms of a full charge electric range (km) according to $$I_x = \text{erange}_{nom} * r_{x,diff}/r_{avg}$$

where $I_x$=impact of factor x on distance to empty relative to the respective nominal condition, $\text{erange}_{nom}$=electric range at full charge corresponding to the respective nominal condition, and $r_{avg}$=average total energy consumption rate of the vehicle.

In operation 660, the controller may display the relative impact of the auxiliary loads, the relative impact of the propulsion system, and the relative impact of the external factors on an interface. In operation 660, the controller may also display a RPC which accounts for the relative impact factors. Each of the relative impacts may be displayed individually on the interface to provide clarity on the effect of the energy consumption categories relative to the RPC. This clarity may provide a driver with an understanding of the electric range effect relating to driving style and system operations. As such, the output to the display may provide information to a driver to identify categorical energy consumption of the vehicle under multiple operating conditions.

Figure 7A:
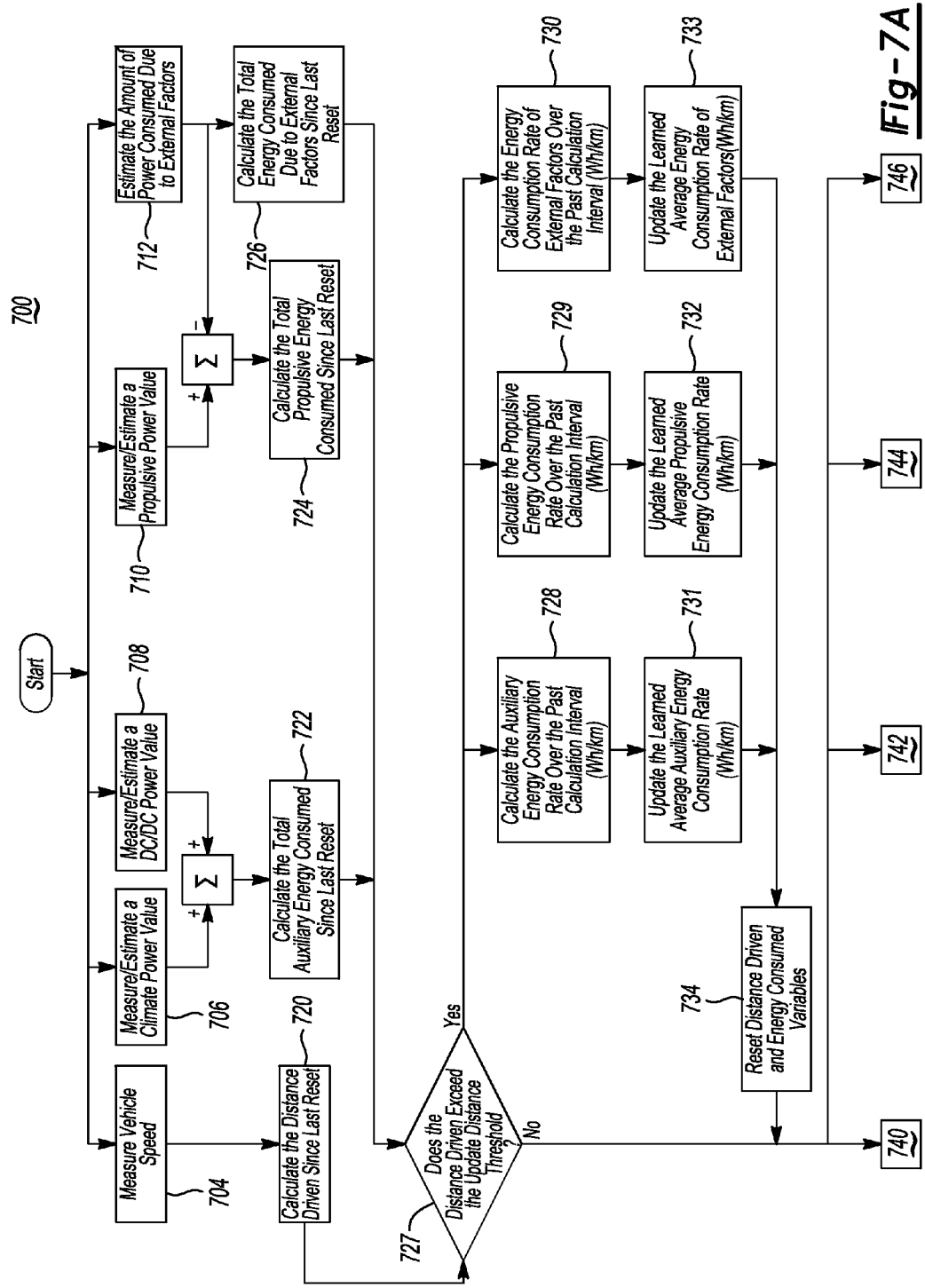
FIGS. 7A and 7B are a flow chart illustrating an example of a distance-based algorithm for operation of a RPC prediction architecture.
Figure 7B:
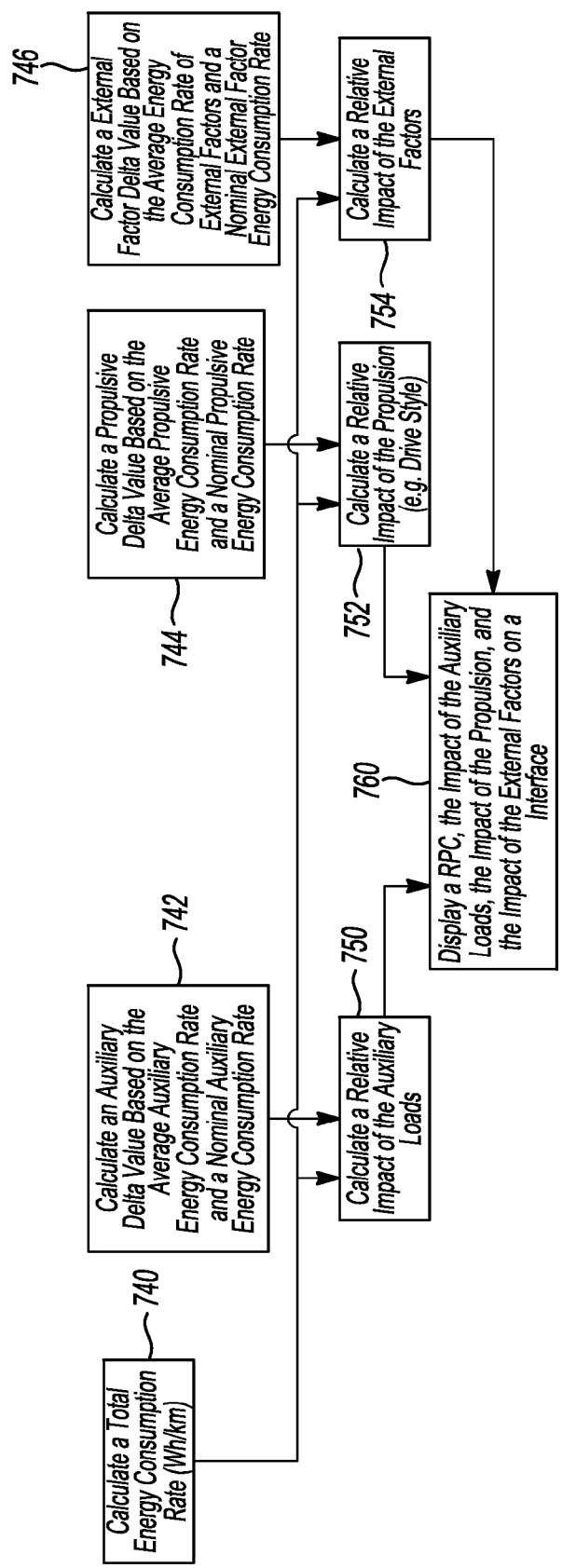

FIGS. 7A and 7B show an example of an algorithm with a distance-based average for calculating a rated or target RPC for an electrified vehicle, for example the vehicle 200, which may predict energy consumption outputs for display on an interface, for example the interface 214. The energy consumption outputs may be displayed as indicators which identify various categorical impact factors which affect energy consumption of the vehicle. The algorithm is generally indicated by reference numeral 700. In this example, the energy consumption categories may include an auxiliary category and a propulsive category though it is contemplated that other energy consumption categories or groupings of categorical impact factors may be utilized with the algorithm 700. In this example, the auxiliary category may include energy consumption due to operation of vehicle components, for example the vehicle components 208, such as a climate control system and components requiring DCDC loads. The propulsive category may include two propulsion related sub categories. Propulsive factors which are driver controlled may be a first sub category and external factors which are outside the control of the driver may be a second sub category which may be referred to as an external factor category or an ambient factor category herein. The driver controlled sub category may be referred to as a driver style category herein. The driver style category may include energy consumption effects which may occur or are present during a drive cycle relating to, for example, acceleration, regenerative braking energy recapture performance, elevation changes, and cruising speed. The external factors category may include energy consumption effects which may occur or are present during a drive cycle relating to, for example, air density or a cold start of the vehicle.

In operation 704, one or more sensors, for example the one or more sensors 210, may measure a speed of the vehicle and transmit the measurement to a controller, such as the controller 212. In operation 706, the one or more sensors may measure an amount of energy consumed by a climate system and transmit the information to the controller which may estimate a climate power value. In operation 708, the one or more sensors may measure an amount of energy consumed by DCDC loads and transmit the information to the controller which may estimate a DCDC power value. In operation 710, the one or more sensors may measure energy consumption by propulsive factors of the driver style category and transmit the information to the controller which may estimate a propulsive power value. In operation 712, the controller may estimate an amount of power consumed by the propulsive factors of the external factor category. As such, the controller may calculate an amount of power consumed due to the propulsive factors of the external factor category according to $$P_{ext} = mass*g*\sin(\theta_{grade})*v(k) + f_1(T_{oil}p_{tire}) + f_2(\rho_{amb})$$

where $P_{ext}$=power consumed due to the external factors, m=vehicle mass, g=acceleration due to gravity, v=vehicle speed, $T_{oil}$=oil temperature, $p_{tire}$=tire pressure, $\rho_{amb}$=ambient pressure, $f_1(,)$=calibration table representing the effects of vehicle warm up as a function of oil temperature and tire pressure, and $f_2(\ )$=calibration table representing the effects of air density. In another example, $P_{ext}$ may be calculated based on one or more calibration tables and test data relating to an additional amount of power required to drive the vehicle under various conditions, such as cooler ambient temperatures and/or oil temperatures. The controller may also calculate the propulsive power value excluding the amount of energy consumed due to the external factors according to $$P_{prop,base} = P_{prop} - P_{ext}$$

where $P_{prop,base}$=propulsive power excluding external factors and $P_{prop}$=propulsive power.

In operation 720, the controller may calculate a distance travelled over a calculation interval. In operation 722, the controller may calculate a total amount of auxiliary energy consumed over the calculation interval. In operation 724, the controller may calculate a total amount of propulsive energy consumed over the calculation interval. In operation 726, the controller may calculate a total amount of energy consumed due to external factors for the calculation interval. For example, the controller may calculate the total amount of energy consumed for auxiliary, propulsive, and external factors in watts-hours according to $$e_{x,interval} = \Delta t * p_x$$

where $e_{x,interval}$=energy consumed over the calculation interval and $\Delta t$=calculation loop time. The controller may also calculate the distance driven over the interval according to $$d_{dist,interval} = \Delta t * v(k)$$

In operation 727, the controller may determine if the distance traveled has exceeded an update distance threshold or update interval. If the threshold has been exceeded, the controller may update the learned energy consumption rates. In operation 728, the controller may calculate an auxiliary energy consumption rate (Wh/km) based on the distance driven and the amount of auxiliary energy consumed over the update interval. In operation 729, the controller may calculate a propulsive energy consumption rate (Wh/km) based on the distance driven and the amount of propulsive energy consumed over the update interval. In operation 730, the controller may calculate an energy consumption rate of external factors (Wh/km) based on the distance driven and the amount of energy consumed due to external factors over the update interval.

In operation 731, the controller may update the learned average auxiliary energy consumption. This learned average may correspond to a calibratable distance interval. For example, a calibratable distance may be a preselected distance over which the range outputs may be based upon. The calibratable distance may correspond to a range in which the vehicle is rated to travel on a full charge of the energy source. The calibratable distance may correspond to a targeted range in which the vehicle may travel on a full charge of the energy source. Optionally, the driver may select the calibratable distance in accordance with the driver's preference. In operation 732, the controller may update the learned average propulsive energy consumption rate. In operation 733, the controller may update the learned average energy consumption rate. For example, the controller may update learned energy consumption rate for auxiliary, propulsive, and external factors in watt-hours per kilometer according to $$r_{x,avg}(k) = (1-\alpha)*r_{x,avg}(k-1) + \alpha*r_x(k)$$

where $r_{x,avg}$=average energy consumption rate for factor x, $r_x$=current energy consumption rate for factor x, k=discrete distance index, and $\alpha$=filter constant. Once the learned energy consumption rates have been updated, the controller may in operation 734 reset the distance driven and energy consumed to zero.

In operation 740, the controller may calculate a total energy consumption rate (Wh/km) based on the average auxiliary consumption rate, the average propulsive energy consumption rate, and the average energy consumption rate of the external factors. For example, the controller may calculate the average energy consumption rate for auxiliary, propulsive, and external factors in watts-hours per kilometer and the average total energy consumption rate according to $$r_{x,avg} = e_{x,dist}/d_{dist}$$

where $r_{x,avg}$=average energy consumption rate due to factor x, $e_{x,dist}$=energy consumed over the calibratable distance for factor x, and $d_{dist}$=calibratable distance.

In operation 742, the controller may calculate an auxiliary delta value based on the average auxiliary energy consumption rate and a nominal auxiliary energy consumption rate. In operation 744, the controller may calculate a propulsive delta value based on the average energy consumption rate and a nominal propulsive energy consumption rate. In operation 746, the controller may calculate an external factor delta value based on the average energy consumption rate of external factors and a nominal external factor energy consumption rate. The nominal values for the auxiliary consumption rate, the propulsive energy consumption rate, and the energy consumption rate of the external factors may each be based on data obtained during a fuel economy certification cycle. This data may be accessible by the controller. For example, the controller may calculate the difference between the average rates and nominal conditions for auxiliary, propulsive, and the external factors (Wh/km) according to $$r_{x,diff} = r_{x,avg} - r_{x,nom}$$

where $r_{x,diff}$=different in energy consumption rate (i.e. delta value) for factor x and $r_{x,nom}$=nominal energy consumption rate of factor x.

In operation 750, the controller may calculate a relative impact of the auxiliary loads based on the total energy consumption rate and the auxiliary delta value. In operation 752 the controller may calculate a relative impact of the propulsion system based on the total energy consumption rate and the propulsive delta value. In operation 754 the controller may calculate a relative impact of the external factors based on the total energy consumption rate and the external factor delta value. For example, the controller may calculate the effect of each energy consumption category relative to distance to empty and in terms of a full charge electric range (km) according to $$I_x = \text{erange}_{nom} * r_{x,diff} / r_{avg}$$

where $I_x$=impact of factor x on distance to empty relative to the respective nominal condition, $\text{erange}_{nom}$=electric range at full charge corresponding to the respective nominal condition, and $r_{avg}$=average total energy consumption rate of the vehicle.

In operation 760, the controller may display the relative impact of the auxiliary loads, the relative impact of the propulsion system, and the relative impact of the external factors on an interface. In operation 760, the controller may also display a RPC which accounts for the relative impact factors over the calibratable distance. Each of the relative impacts may be displayed individually on the interface to provide clarity on the effect of the energy consumption categories relative to the RPC. This clarity may provide a driver with an understanding of the electric range effect relating to driving style and system operations. As such, the output to the display may provide information to a driver to identify categorical energy consumption of the vehicle under multiple operating conditions.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A method for estimating range per full charge (RPC) for a vehicle comprising:
   in response to detecting presence of a predefined condition impacting vehicle energy consumption, outputting to an interface by a controller a RPC and stacked indicia adjacent one another to provide a visual comparison to a driver of an extent to which climate control, driver style, and external conditions are each separately affecting the RPC.

2. The method of claim 1, wherein the predefined condition includes at least one of an auxiliary load factor, a propulsive factor due to driving style, a propulsive factor due to battery age, and a propulsive factor due to ambient conditions.

3. The method of claim 2, wherein the RPC is calculated based on an average auxiliary energy consumption rate, an average propulsive power consumption, and an average total energy consumption rate that account for the predefined condition and are based on a preselected calibratable distance of vehicle travel.

4. The method of claim 3, wherein the RPC is calculated based on a learned average vehicle speed, a learned average auxiliary power consumption, a learned average propulsive power consumption, and a learned average external factor power consumption that account for the predefined condition and are learned during a predefined interval of a drive cycle while the predefined condition is present.

5. The method of claim 4, wherein the RPC and indicia are further based on a total vehicle energy consumption associated with the predefined interval.

6. The method of claim 5, wherein the RPC is calculated based on a difference between the energy consumption rates and preselected nominal consumption conditions associated with the predefined condition.

7. The method of claim 6, wherein the interval is a time-based interval.

8. The method of claim 6, wherein the interval is a trip-based interval.

9. The method of claim 6, wherein the interval is a distance-based interval.

10. The method of claim 1, wherein at least one of the indicia is a graphical element showing range distance relative to a state of charge of an energy storage device of the vehicle.

11. The method of claim 1, wherein at least one of the indicia is a graphical element showing a power consumption percentage relative to a state of charge of an energy storage device of the vehicle.

12. The method of claim 1, wherein at least one of the indicia is a graphical element showing a power consumption percentage relative to the RPC over a preselected calibratable distance.

13. An electrified vehicle comprising:
   one or more vehicle components;
   a traction battery to supply energy to the vehicle components;
   one or more sensors to monitor the vehicle components, traction battery, and preselected ambient conditions; and
   a controller programmed to, in response to input from the sensors, generate output for an interface which includes a RPC and stacked indicia adjacent one another to provide a visual comparison to a driver indicative of an extent of impact on the RPC by each of a climate control system, driver style, and external conditions based on the ambient conditions and operation of the components and battery.

14. The vehicle of claim 13, wherein at least one of the vehicle components is configured for activation by a driver and wherein the indicia includes an indicator identifying a reduction in the RPC due to activation of the at least one of the vehicle components.

15. The vehicle of claim 13, wherein at least one of the vehicle components draws current from the battery when activated and wherein the indicia includes an indicator identifying a reduction in the RPC due to activation of the at least one of the vehicle components.

16. The vehicle of claim 15, wherein the indicia is a graphical element showing a power consumption percentage relative to a preselected time-based interval, a trip-based interval, or a distance-based interval.

17. A vehicle traction battery system comprising:
a traction battery;
a vehicle component to measure current draw from a climate control system, driver style, and external conditions;
an interface; and
a controller programmed to, in response to detecting an energy consumption change condition due to the drawn current, output to the interface a RPC and stacked indicia adjacent one another to provide a visual comparison to a driver indicative of an extent of change to the RPC due to the drawn current.

18. The vehicle of claim 17, wherein at least one of the indicia is a graphical element showing a power consumption percentage relative to a preselected time-based interval, a trip-based interval, or a distance-based interval.

19. The vehicle of claim 17, further comprising another vehicle component configured to be activated by a driver, wherein the controller is further programmed to, in response to detecting an activation condition for the another vehicle component, output to the interface indicia indicative of an extent of a change to the RPC due to activation of the another vehicle component.

20. The vehicle of claim 17, wherein the controller is further programmed to, in response to detecting an energy consumption change condition due to ambient conditions, output to the interface indicia indicative of an extent of change to the RPC due to the ambient conditions.

* * * * *